J. M. BOYLE.
COMPARATIVE RECORDING APPARATUS.
APPLICATION FILED APR. 1, 1907.
910,493.
Patented Jan. 26, 1909.
2 SHEETS—SHEET 1.
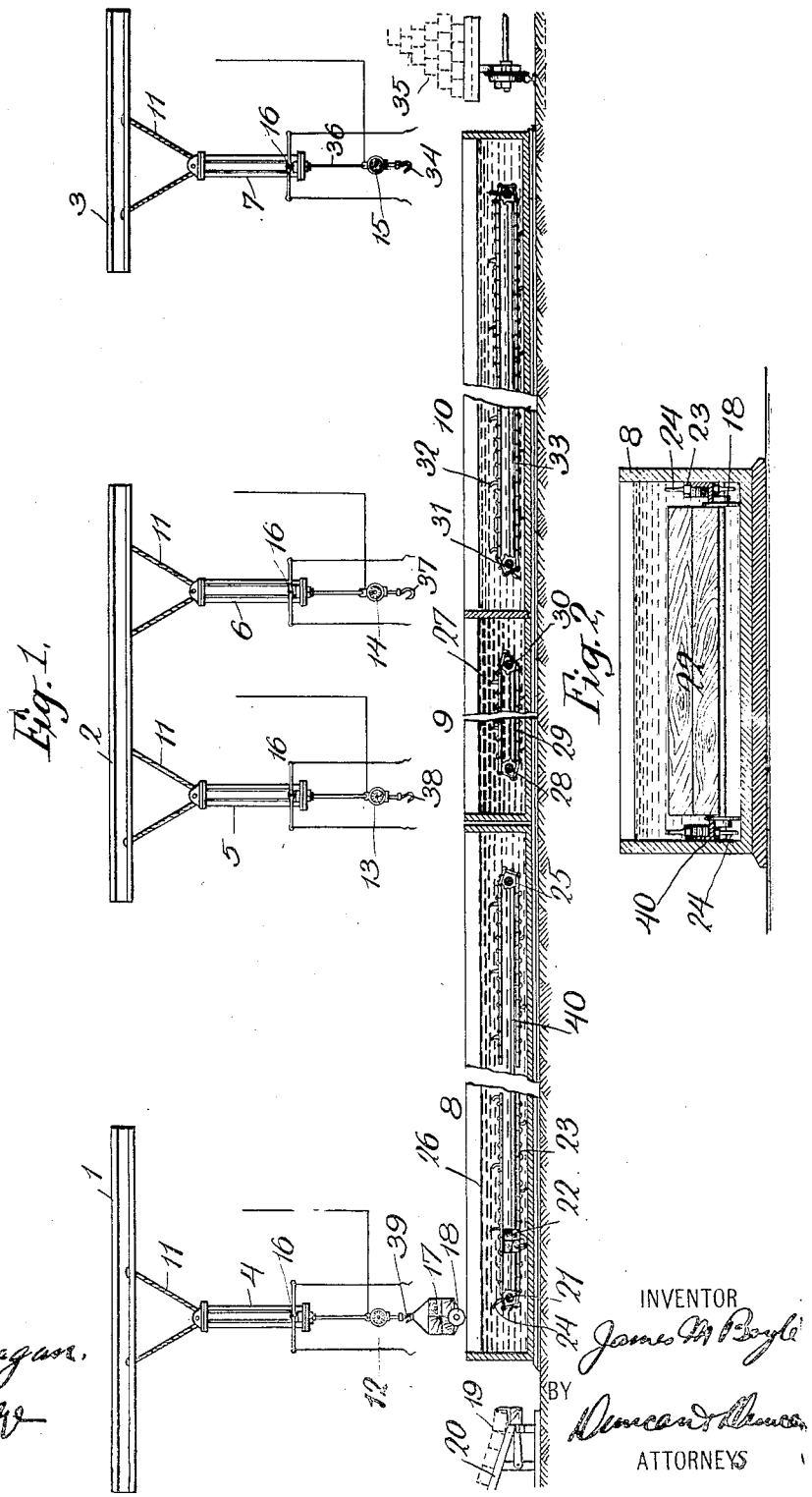
WITNESSES:
INVENTOR
ATTORNEYS

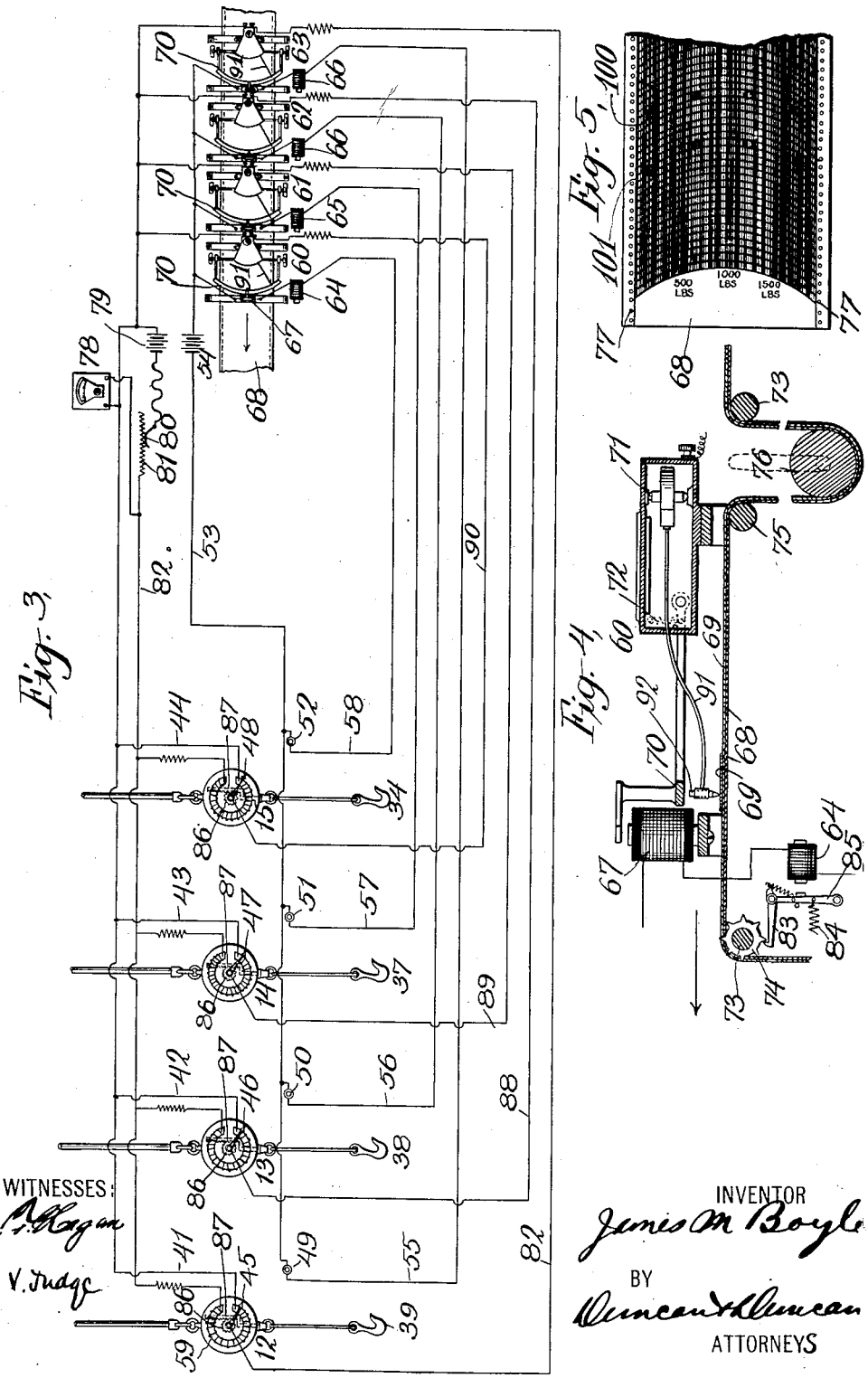

UNITED STATES PATENT OFFICE.

JAMES M. BOYLE, OF NEW YORK, N. Y., ASSIGNOR TO EDWIN N. SANDERSON, OF NEW YORK, N. Y., HENRY HOBART PORTER, OF LAWRENCE, NEW YORK, FRANCIS BLOSSOM AND RICHARD S. BUCK, OF MONTCLAIR, NEW JERSEY, AND RICHMOND TALBOT, OF TUXEDO, NEW YORK, DOING BUSINESS AS THE FIRM OF SANDERSON & PORTER, OF NEW YORK, N.Y.

COMPARATIVE RECORDING APPARATUS.

No. 910,493.     Specification of Letters Patent.     Patented Jan. 26, 1909.

Application filed April 1, 1907. Serial No. 365,662.

*To all whom it may concern:*

Be it known that I, JAMES M. BOYLE, a citizen of the United States, and resident of the city, county, and State of New York, have invented certain new and useful Improvements in Comparative Recording Apparatus, of which the following is a specification, taken in connection with the accompanying drawings, forming part of the same.

This invention relates to comparative recording apparatus for recording the weight or other properties of articles at successive periods of a manufacturing or treating process. Testing devices are arranged at suitable stations so that they act upon each one of the series of treated articles at that stage of the process determining their weight, temperature, electrical conductivity, or other properties. These testing devices are connected with a multiple recorder comprising a series of indicators, each one of which is connected with and actuated by the corresponding testing device and the record in the form of a strip or otherwise is fed through the recorder in such way that the several indications relating to a single article may be grouped together for ready comparison.

The illustrative embodiment of this invention relates especially to apparatus for recording the weights of ties or similar articles at successive stages of a timber preserving process to which they are subjected.

In the accompanying drawings diagrammatically showing illustrative embodiments of this invention, Figure 1 is a longitudinal sectional view. Fig. 2 is a transverse section. Fig. 3 shows diagrammatically the circuit connections. Fig. 4 is a vertical section on an enlarged scale through the indicator. Fig. 5 shows a portion of the record strip.

In the illustrative embodiment of this invention shown in the drawings, a series of timber preserving tanks are indicated. The hot oil tank 8 may contain the hot creosote or similar material kept at the desired temperature by steam pipes or other heating devices. The sprocket shafts 21, 25 may as indicated be journaled transversely adjacent either end of the tank to support and operate the sprocket or feeding chains 23 provided with the grippers 24 at intervals along the same. These grippers are adapted to engage the projecting ends of the shaft secured to the tie bundle 17 or other article to be treated so as to feed the article slowly through the tank. This shaft may be provided as indicated in Fig. 2, with the guide wheels 18 to engage the guides 40 arranged on the sides of the tank so that the article 17 lowered into the tank at its receiving end is engaged by the grippers, carried under the surface 26 of the creosote or other treating material and then carried slowly along the tank in the position of the article 22 shown in Figs. 1 and 2. The cold oil tank 9 may be provided with similar sprocket shafts 28, 30 actuating the feed chain 29 in similar manner to feed articles through the cold creosote or other material 27. The solution tank 10 for containing the zinc chlorid or other antiseptic solution may be located in the same line as the other tanks 8 and 9 and carries similar sprocket shafts 31 to operate the feeding chain 33 having the grippers 32 thereon.

For the convenient insertion and transfer of articles through these tanks, suitable hoists 4, 5, 6 and 7 may be provided at stations at the initial end of these tanks and at the discharge end of the solution tank, these hoists being shown as supported by suspenders 11 from the supports 1, 2 and 3. Standard air hoists may be used for this purpose, actuated in the usual way through the throttle valve 16, and the stem of the hoist 4 may be secured to the balance or spring scale 12 from which the hook 39 is supported, so that articles hanging on this hook and lowered by the hoist into the hot oil tank 8 can be conveniently weighed at such time by the balance 12. In this particular treating process the articles arranged on the table 20 are picked up after being arranged in suitable units, if desired, and lowered into the hot oil tank 8 by the hoist 4 after being weighed at this initial station. Then after being slowly fed through the hot oil tank the articles float or are raised to the top of the oil at the discharge end of the tank and may then be quickly raised upon the hook 38 by the operator using the air hoist 5 at the second station and weighed at this stage of the process before being lowered into the cold oil tank 9 which should be done as quickly as possible. Each article after passing through the tank 9 floats or is raised to the surface of the liquid in the same way and may be raised by the hoist 6 at the third station and weighed before being plunged into the solution tank 10. At the discharge end of this tank the article may be raised by the hoist 7 at the terminal station and weighed at the end of the treating process before being placed on the car or other receptacle 35.

Each of the balances may be provided with the balance bar 87 meshing, as indicated in Fig. 3, with the balance pinion 86 so as to rotate the balance arm 45 when pulled down against the weighing spring as customary in such balances. The arm 45 passes over and makes electrical contact with the balance coil or resistance 59 which may be arranged circumferentially on the balance as indicated. A current of the desired strength may be sent through the balance coil by the battery or other source of electricity 79, the circuit extending through the regulator resistance 81 which may be adjusted by the movable contact 80, as indicated, the potential of the circuit being adjusted from time to time in accordance with the indications of the regulator or volt meter 78. In this way the balance arm makes electrical contact with different parts of this balance coil as the arm moves around its scale and an electrical current of corresponding intensity passes through the indicator circuit 82 so as to actuate the needle 91 of the indicator 63 to the proper extent. This indicator may be any electrical indicating apparatus, such as a standard volt meter moving the needle substantially in proportion to the potential of the point engaged by the balance arm, the absolute position of the needle being adjustable by regulating the amount of resistance in the resistance coil adjacent the balance which is in the indicator circuit, so that zero settings can be conveniently made at any time. As indicated in Fig. 4, the needle 91 may swing about its pivot 71 within the case of the instrument and carry at its outer free end the marker 92 which in this instance plays in a circular arc over the impression strip 69 and the record strip 68 and normally out of contact with such strips, the position of the marker upon the record strips thus indicating the weight of the article suspended from the hook 39.

Under the described conditions of use the hoists are only intermittently employed in lifting articles and the operator at each station may raise an article by the hoist and then when the balance has ceased to oscillate so that it correctly indicates the weight of the article, he may produce a suitable mark on the record strip by operating suitable actuating means which may comprise the actuator switch 49, which may be in the form of a push-button or the like. This closes the actuator circuit, allowing electricity from the battery or other source of potential 54 to flow through the line 53, the switch 49 and line 55 to energize the actuator magnet 67 and the feed magnet 64. When the actuator magnet 67 is energized the armature on the actuator 70 is attracted and swings down, making forcible contact with the marker 92 and causing the proper mark or impression to be made on the record strip, after which the circular actuator is drawn upward by the spring 72 into inactive position in the illustrative construction indicated. The closing of the actuator switch may also serve to feed forward the record strip one space after the marker has made its record; and any desired form of electrical escapement may be used for this purpose, a diagrammatic arrangement being indicated in Fig. 4 as comprising the feed magnet 64 operating to draw the feed lever 85 forward against the action of the spring 84 so that the pivoted spring-pressed arm 83 acts upon the ratchet 74 on the feeder 73. This ratchet as indicated may also serve to engage the holes 77 which are indicated in Fig. 5 as being formed along the edges of the record strip so that the strip is positively fed forward to the desired extent.

As indicated, the multiple recorder may comprise in this instance four similar indicators 60, 61, 62 and 63, connected to and actuated by the balances and actuator switches at the various stations to act successively upon the record strip 68 fed through them by the intermittently actuated feed roll 73 in each indicator. In order to make certain that the successive marks made by each indicator are located at the proper point along the strip, take-ups may be arranged between the indicators of the series, as shown in Fig. 4. The take-up roll 76 is indicated as guided in suitable grooves located between the feeder 73 and the next idle roll 75 over which the strip 68 passes so that a loop of the desired length may be made in the record strip. With this arrangement it is unnecessary that the various weighing operations be exactly timed and the articles may be weighed at the various stations at any time desired so long as they are kept in the proper order as they are weighed and passed through the various steps of the treating process. In this particular timber preserving process the articles fed into the hot oil tank contain some moisture which is driven off by the heat of the oil in this tank so that the initial weight A of an article, that is the weight indication given by the weight mark A made on the record strip by the marker of the first indicator of the series, is greater than the weight B shown in Fig. 5 when the article leaves the hot oil tank at the second station. The articles absorb some creosote in the cold oil tank so that the weight C of the articles at the third station when they have left this tank is greater than the weight B of the entering articles; and similarly, also, the weight D of the articles at the terminal station after they have been discharged from the solution tank is still greater because considerable preserving or antiseptic solution has been absorbed by the articles in this final tank. By arranging loops of suitable length between the several indicators so as to correspond with the number of articles in each tank in the process the indications on the record strip relating to any one article may be brought into proper alinement so that the weights of a single article may if desired be located on the same circular arc 100, as shown in Fig. 5, and the weight indications on the arc 101 also relate to another article; and under these conditions this would necessarily remain the case so long as the articles were maintained in the same order throughout the various steps of the process. In this way a very convenient comparison of the effect of such a treatment on the different articles may be made; the amount of absorption of the various preservatives being directly indicated in a very graphic way as well as the amount of moisture driven off during the preliminary stage of the process, it being understood, however, that the indications shown in Fig. 5 are diagrammatic only and do not correspond exactly to numerical results obtained in this treating process.

Having described this invention in connection with an illustrative embodiment thereof, to the details of which disclosure it is not, of course, to be limited, what is claimed as new and what is desired to be secured by Letters Patent is set forth in the appended claims.

1. In comparative recording apparatus for recording the successive weight changes in articles during a preserving process in which the articles pass from an initial station through a hot oil tank to a second station, then through a cold oil tank to a third station and then through a solution tank to a terminal station; actuator switches and combined hoists and balances located at each of said stations and comprising a balance coil and balance arm electrically coöperating with said coil to make electrical contact therewith corresponding to the weight on said balance and a multiple recorder comprising a series of indicators each having an indicator circuit connected with the corresponding balance and actuating a marker mounted on its needle and normally freely playing above the record strip and having an actuator circuit comprising an actuator magnet, a movable actuator coöperating with said marker and comprising a feed magnet and feed devices actuated thereby to intermittently feed forward said record strip and looping devices for said strip between each of said indicators.

2. In comparative recording apparatus for recording the successive weight changes in articles during a preserving process in which the articles pass from station to station through different steps of the process, actuator switches and combined hoists and balances located at each of said stations, each of said balances comprising a balance resistance and a balance member coöperating with said resistance to make electrical contact therewith and corresponding to the weight on said balance and a multiple recorder comprising a series of indicators, each having an indicator circuit connecting with the corresponding balance and actuating a marker adjacent the record strip and having an actuator circuit comprising a movable actuator coöperating with said marker to produce a mark on said record strip, means to operate said actuator and feed devices to intermittently feed forward said strip and a looping device for said strip between two of said indicators.

3. In comparative recording apparatus for recording the successive weight changes in articles during a process in which the articles pass from station to station through successive steps of said process, actuating means and combined hoists and balances located at each of said stations, each of said balances comprising means to electrically indicate the weight on said balance and a multiple recorder comprising a series of indicators each having an indicator circuit connected with the corresponding balance and actuating marking means coöperating with the record strip and having an actuator operated by said actuating means and coöperating with said marking means to produce a record on said strip and comprising feeding means operated by said actuating means to feed said record strip and a looping device for said strip between two of said indicators.

4. In comparative recording apparatus for recording the successive weight changes in articles during a process in which the articles pass from station to station through the steps of said process, actuating means and balances located at each of said stations, each of said balances comprising electrical means for indicating the weight on said balance and a multiple recorder comprising a series of indicators, each having an indicator circuit connected with the corresponding balance and actuating marking means coöperating with a record and having an actuator operated by said actuating means and coöperating with said marking means to produce a mark on said record and comprising feeding means operated by said actuating means to feed along said record and a take-up device for said record between two of said indicators.

5. In comparative recording apparatus for recording the successive weight changes in articles passing from station to station through the steps of a process, balances located at said stations each comprising means for electrically indicating the weight on said balance and a multiple recorder comprising a series of indicators each connected with the corresponding balance and actuating marking means coöperating with said record and means to feed said record.

6. In comparative recording apparatus for recording the successive weight changes in the articles passing from station to station through the steps of a process, balances located at each of said stations and comprising weighing means to indicate the weight on said balance and a multiple recorder comprising a series of indicators each connected with the corresponding balance and having marking means actuated by said weighing means and coöperating with the record and feeding means for said record.

7. In comparative recording apparatus for recording the successive weight changes in articles passing from station to station through the steps of a process, actuating means and balances located at each of said stations, each of said balances comprising weighing means to indicate the weight on said balance and a multiple recorder comprising a series of indicators each connected with the corresponding balance and having marking means actuated by said weighing means and coöperating with the record and having an actuator operated by said actuating means and coöperating with said marking means to produce a mark on said record and feeding means operated by said actuating means to feed forward said record.

8. In comparative recording apparatus for recording the successive weight changes in articles passing from station to station through the steps of a process, actuating means and balances located at each of said stations, each of said balances comprising weighing means to indicate the weight on said balance and a multiple recorder comprising a series of indicators each connected with the corresponding balance and comprising marking means operated by said weighing means and coöperating with the record and having an actuator operated by said actuating means and coöperating with said marking means to produce a mark on said record and having feeding means operated by said actuating means to intermittently feed forward said record and a looping device for said record between two of said indicators.

9. In comparative recording apparatus for recording successive changes in articles passing from station to station through the steps of a process, actuating means and testing devices located at each of said stations and a multiple recorder comprising a series of indicators each connected with the corresponding testing device and comprising marking means actuated by said testing device and coöperating with the record and having an actuator operated by said actuating means and coöperating with said marking means to produce a mark on said record and feeding means operated by said actuating means to feed said record.

10. In comparative recording apparatus for recording the successive changes in articles passing from station to station through the steps of a process, testing devices located at each of said stations to coöperate with said articles and a multiple recorder comprising a series of indicators each connected with the corresponding testing device and having marking means operated by said device and coöperating with a record.

11. In comparative recording apparatus for recording the successive changes in articles passing from station to station through the steps of a process, testing devices located at each of said stations to coöperate with said articles and a multiple recorder comprising a series of indicators each connected with the corresponding testing device and having marking means operated by said device and coöperating with a record, and means to actuate said marking means.

12. In comparative recording apparatus for recording the successive changes in articles passing from station to station through the steps of a process, actuating means and testing devices located at each of said stations and a multiple recorder comprising a series of indicators each connected with the corresponding testing device and coöperating with the record strip and having an actuator operated by said actuating means and coöperating with said marking means to produce a mark on said record, feeding means for said record strip and a looping device for said record strip between two of said indicators.

13. In comparative recording apparatus for recording the successive changes in articles passing from station to station through the steps of a process, actuating means and testing devices located at each of said stations and a multiple recorder comprising a series of indicators each connected with the corresponding testing device and having marking means operated by said device and adapted to coöperate with the record strip and having an actuator operated by said actuating means and coöperating with said marking means to produce a mark on said strip and having feeding means operated by said actuating means to feed said record strip and a looping device for said strip between two of said indicators.

14. In comparative recording apparatus for recording successive changes in articles passing from station to station through the steps of a process, actuator switches and testing devices located at each of said stations and a multiple recorder comprising a series of indicators each having an indicator circuit connected with the corresponding testing device and having a marker operated by said testing device and coöperating with the record strip and having an actuator circuit including the corresponding actuator switch and comprising a movable actuator coöperating with said marker and comprising feed devices to intermittently feed forward said record strip.

15. In comparative recording apparatus for recording the successive changes in articles passing from station to station through the steps of a process, actuator switches and testing devices located at each of said stations and a multiple recorder comprising a series of indicators each having an indicator circuit connected with the corresponding testing device and having marking means operated by said device and coöperating with the record strip and having an actuator circuit including the corresponding actuator switch and comprising an actuator operated thereby and coöperating with said marking means to produce a mark on said record strip and comprising feeding devices to intermittently feed forward said record strip and looping devices for said record strip between said indicators.

JAMES M. BOYLE.

Witnesses:
HARRY L. DUNCAN,
SAFFORD K. COLBY.